United States Patent [19]

Takata et al.

[11] Patent Number: 5,375,676
[45] Date of Patent: Dec. 27, 1994

[54] BICYCLE WITH ELECTRIC MOTOR

[75] Inventors: Nozomu Takata; Tatsuji Yokoyama, both of Iwata, Japan

[73] Assignee: Yamaha Hatsudoki Kabushiki Kaisha, Iwata, Japan

[21] Appl. No.: 26,868

[22] Filed: Mar. 5, 1993

[30] Foreign Application Priority Data

Mar. 6, 1992 [JP] Japan .................. 4-82917

[51] Int. Cl.⁵ .......................... B62M 23/02
[52] U.S. Cl. .................. 180/206; 180/207;
180/220; 180/65.2; 180/65.8
[58] Field of Search ............ 180/65.2, 65.8, 65.1,
180/206, 205, 207, 220, 907; 280/304.1; 74/388
R, 625

[56] References Cited

U.S. PATENT DOCUMENTS

| | | | |
|---|---|---|---|
| 3,991,843 | 11/1976 | Davidson | 180/214 |
| 4,050,533 | 9/1977 | Seamone | 180/907 |
| 4,122,907 | 10/1978 | Davidson et al. | 280/214 |
| 4,168,758 | 9/1979 | Holt | 180/206 |
| 4,364,448 | 12/1982 | Ikuma | 180/206 |
| 4,422,515 | 12/1983 | Loveless | 280/304.1 |
| 4,869,332 | 9/1989 | Fujita et al. | 180/65.2 |
| 4,871,042 | 10/1989 | Hsu et al. | 180/65.2 |
| 4,923,028 | 5/1990 | Yamashita et al. | 180/219 |
| 5,024,113 | 6/1991 | Ito et al. | 180/65.2 |
| 5,024,286 | 6/1991 | Lean et al. | 180/206 |
| 5,078,227 | 1/1992 | Becker | 180/221 |

FOREIGN PATENT DOCUMENTS

| | | |
|---|---|---|
| 0168905 | 1/1986 | European Pat. Off. . |
| 2259741 | 8/1975 | France . |
| 2411302 | 8/1979 | France . |
| 2403727 | 8/1975 | Germany . |
| 56-76590 | 6/1981 | Japan . |
| 57-74285 | 5/1982 | Japan . |
| 2-74491 | 3/1990 | Japan . |
| 2083423 | 3/1982 | United Kingdom . |

OTHER PUBLICATIONS

European Search Report dated Jun. 15, 1993, Patent Abs. of Japan, vol. 14, No. 113(M–944) 2 Mar. 1990 & JP-A-13 14 685 (Japan II M KK) 19 Dec. 1989.
Patent Abs of Japan, vol. 14, No. 262(M–981) (4205 6 Jun. 1990 & JP-A-20 74 491 (Matsushita Electric Works Ltd) 14 Mar. 1990.

*Primary Examiner*—Mitchell J. Hill
*Assistant Examiner*—Anne Marie Boehler
*Attorney, Agent, or Firm*—Knobbe, Martens, Olson & Bear

[57] ABSTRACT

Art electrically assisted bicycle wherein electric assist is provided is proportion to the manual force for pedalling the bicycle. The device includes an arrangement for maintaining the speed of the electric motor at the same speed as the bicycle even when no force is applied to the pedal even though the bicycle is in motion so as to reduce the time delay and power losses when power assist is required.

19 Claims, 5 Drawing Sheets

BICYCLE WITH ELECTRIC MOTOR

BACKGROUND OF THE INVENTION

This invention relates to a bicycle with a power assist provided by an electric motor and more particularly an improved power assisted manually operated device.

A wide variety of devices have been proposed which are primarily manually operated but which provide a power assist. For example, it has been proposed to provide a bicycle which is pedal operated but which includes an electric motor that is operated so as to assist the pedal operation in proportion to the load exerted at the pedals. Such devices have particular utility but do have some disadvantages.

The electric motor is normally coupled to the driven wheel of the bicycle through a one-way clutch. The one-way clutch is employed so as to accommodate the situation when the motor speed is low or below the actual speed of the bicycle. This condition can exist during a number of circumstances, for example when the traveling down hill or during a condition as will be described.

In conjunction with a bicycle, the pedal operator is normally a crank mechanism and the output force applied by the operator to the pedals varies with the angular position of the pedals. At top and bottom dead centers, no significant propulsion forces are accomplished but as the crank moves between these positions, then a driving force is provided. Because of this mechanism, the power assist, when called for, has a tendency to lag behind the actual demand requirements.

This may be understood by reference to FIG. 1 wherein the solid line curve shows the pedal force in relation to time. A complete cycle of rotation of the pedal is shown and it will be seen that when the pedal is at top dead center, no significant force is applied and as the pedal moves toward bottom dead center, the force will increase and then gradually decrease as bottom dead center is approached. The force output cyclically varies during the next half cycle as seen in this figure. The pedal force depicted in the drawings $F_L$ provides a speed of the bicycle indicated by the line $N_O$.

As a result of the affect of the pedal action, when the pedal moves to one dead center position the force exerted on the pedals will reach zero and the electric motor drive will be discontinued, even though the bicycle is still traveling at the speed $N_O$. As the pedal moves past the dead center position, the force applied to the pedals will call for the increase of electric motor operation. However, the electric motor will not exerted any assist force until the speed of the electric motor reaches the speed at which the bicycle is traveling $N_O$ which gives rise of a time delay of "a" until the power assist comes into effect. As a result of this and as clearly seen in FIG. 1, each half revolution of the pedal mechanism, there will be a slow down and stoppage of the electric motor and then a time delay before the electric motor again assists in the operation. In addition to having a loss in the total amount of power assist, this also consumes excess electrical energy because of the starting and stopping of the electric motor.

It is, therefore, a principal object to this invention to provide an improved arrangement for providing a power assist to a manually operated device.

It is a further object to this invention to provide a power assist for a manually operated device wherein the power assist is always driven at a speed equivalent to that of the manually operated device so that when power assist is called for, the power assist need not be accelerated to that speed.

SUMMARY OF THE INVENTION

This invention is adapted to be embodied in a power assist mechanism for a manually operated device comprising manual driving means for operation to manually drive the manually operated device. A servo motor is also provided for driving the manually operated device to provide a power assist therefore. Means sense the manual force supplied to the manual driving means and control means supply power to the servo motor for providing the driving assist in response to the application of the manual force. Means are provided for applying sufficient power to the servo motor for driving the servo motor at a speed corresponding to the speed of the manually operated device when no manual force is exerted.

DETAILED DESCRIPTION OF THE PREFERRED EMBODIMENT OF THE INVENTION

Figure 1:
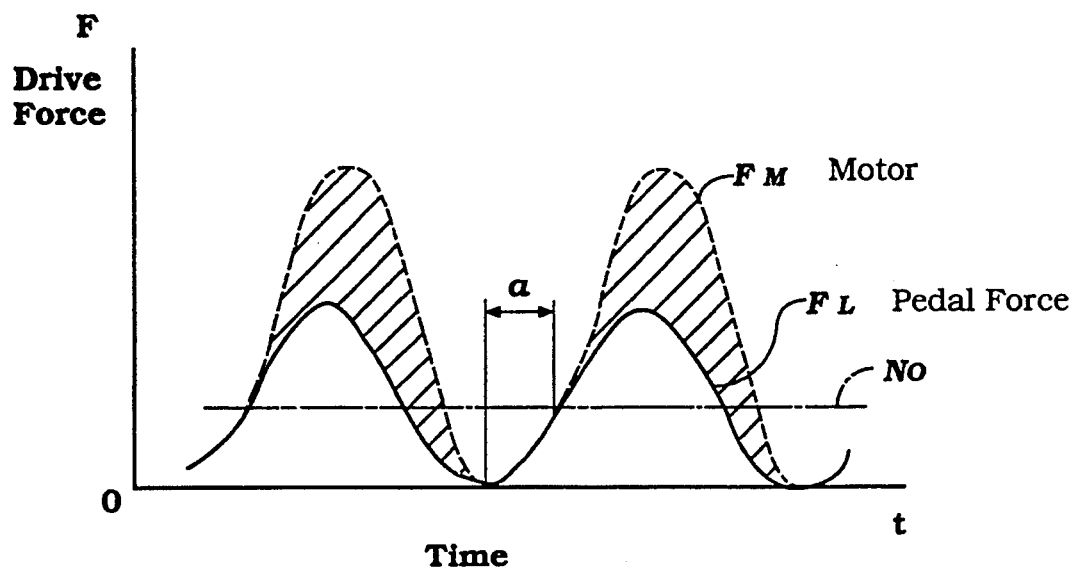
FIG. 1 is a graphical view showing the driving force applied by the pedals and the electric motor in connection with prior art type of constructions and shows the time delay generated thereby.

Referring first to FIG. 1, a bicycle constructed in accordance with an embodiment of the invention is identified generally by the reference numeral 11. The bicycle 11 includes a frame assembly, indicated generally by the reference numeral. 12, having a head tube 13 which journals a front fork 14 for steering movement under the control of a handlebar 15. A front wheel 16 is rotatably journalled by the front fork 14 in a well known manner.

A rear wheel 17 is journalled at the rear end of the frame assembly 12 by means including a pair of rear stays 18 which extend on opposite sides of the rear wheel 17. One of the these stays 18 contains a drive for the rear-wheel 17, as will be described.

A seat tube 19 is carried by the frame assembly 12 adjacent the rear wheel 17 and supports a seat post 21 upon which a saddle type seat 22 is positioned in a known manner.

Beneath the seat tube 19, the frame 12 is provided with a bottom bracket 23 which supports in part a drive mechanism, indicated generally by the reference numeral 24. The drive mechanism 24 is comprised of a manual drive consisting of a crank journalled in a case 25 which is fixed to the bottom bracket 23 by fasteners 20 having a pair of crank arms 26 upon which pedals 27 are rotatably journalled in a known manner. The crank member 25 is connected to a crankshaft 28 for manual rotation of the rear wheel 17 in a manner which will be described.

In addition, an electric motor, indicated generally by the reference numeral 29 is accommodated in the lower bracket 23 and also is adapted to drive the rear wheel 17 in a manner which will be described. The electric motor 29 is powered by a rechargeable type of battery 31, such as a lead battery, and which is controlled by means of a controller 32, both of which are mounted in the upper portion of the frame assembly 12.

In addition, a pedal force detecting device 33 is mounted on the crank assembly. The way in which the pedal force sensor 33 operates will be described later by particular reference to FIGS. 5 and 6.

Figure 3:
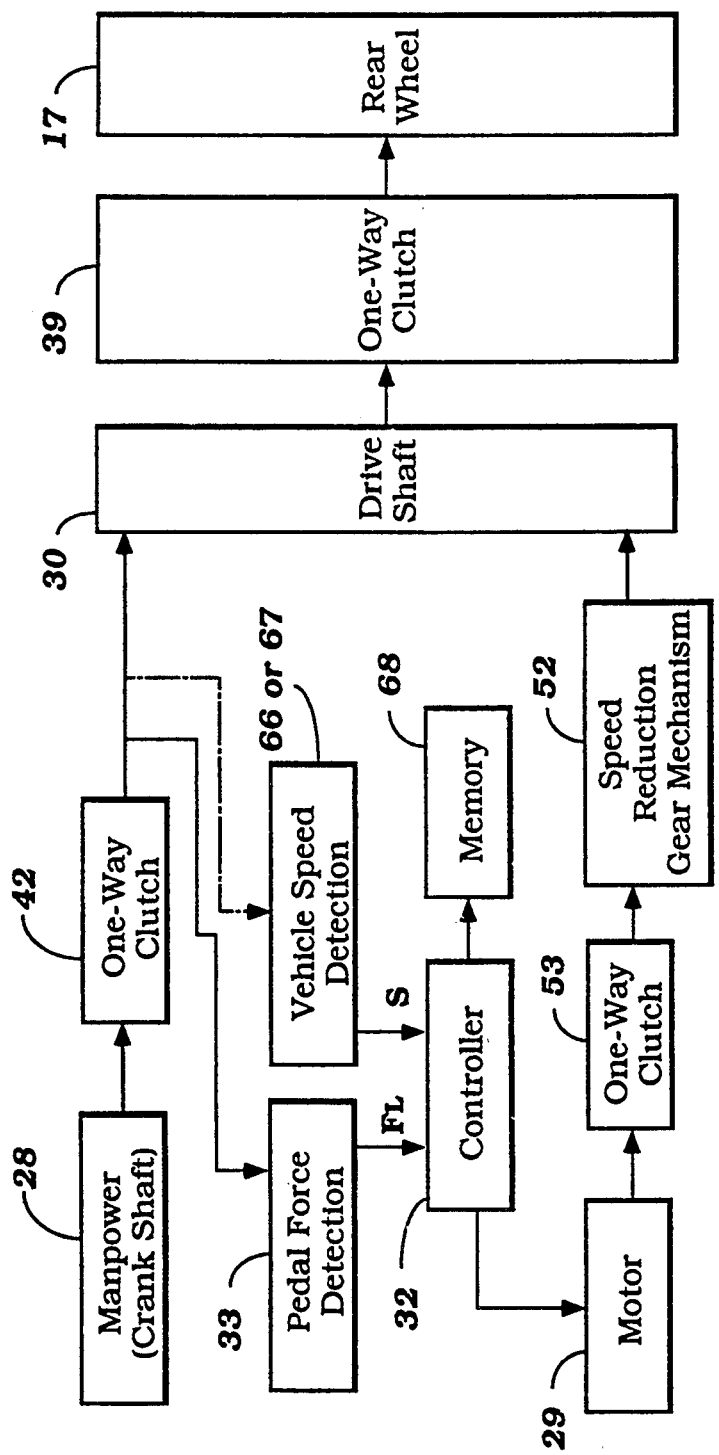
FIG. 3 is a schematic view showing the components of the system.
Figure 4:
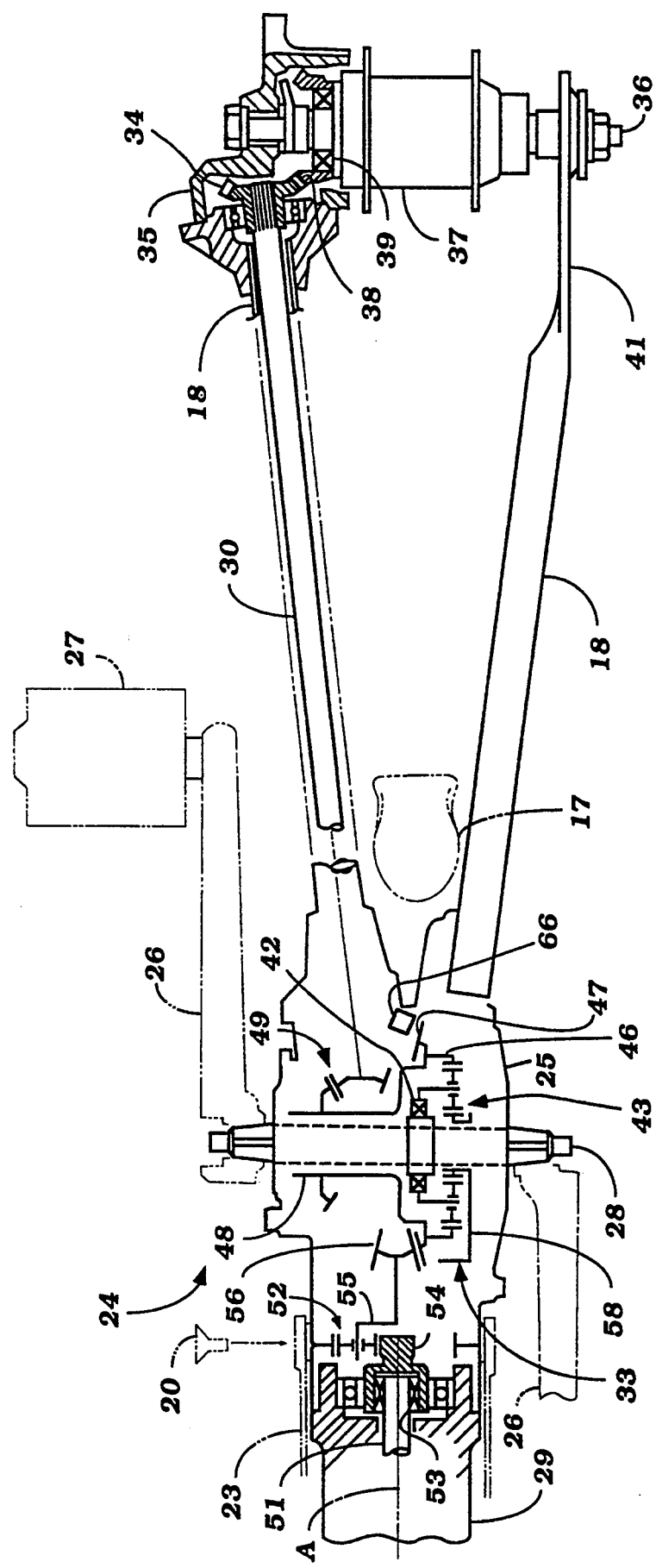
FIG. 4 is an enlarged cross sectional view taken through the drive for the bicycle rear wheel and is taken generally along the line 4—4 of FIG. 2.
Figure 5:
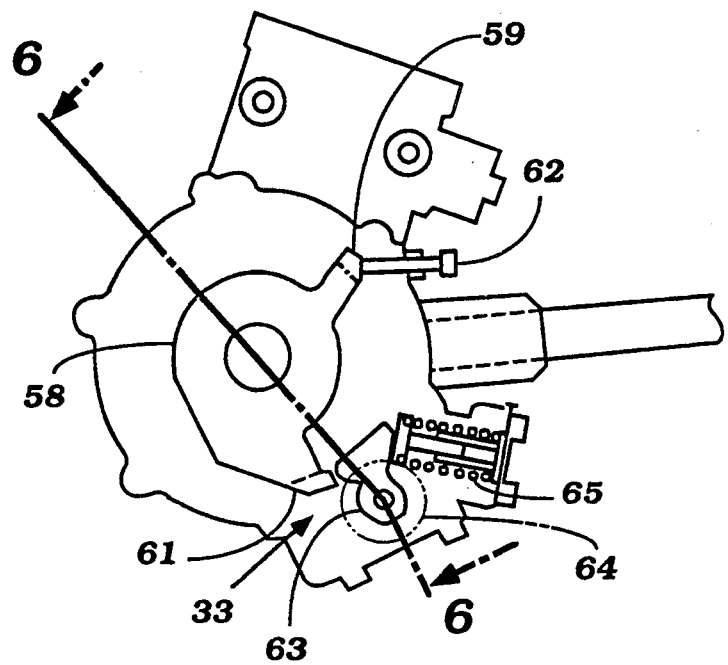
FIG. 5 is a side elevational view showing the device for sensing the force applied to the pedal operated crank mechanism.
Figure 6:
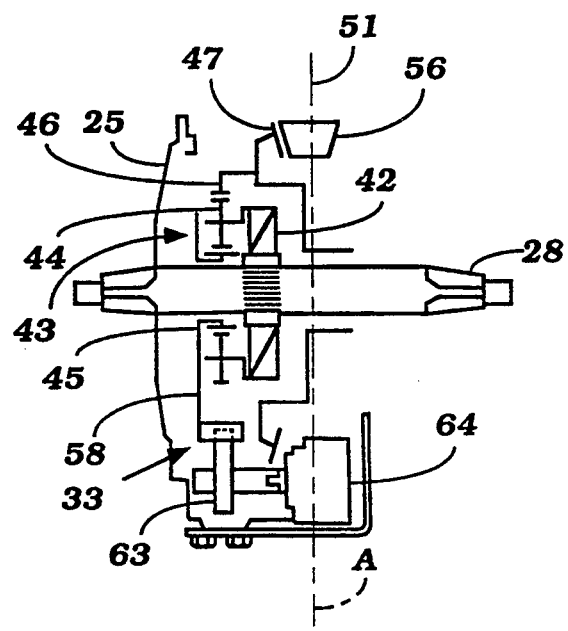
FIG. 6 is a cross sectional view taken along the line 6—6 of FIG. 5.

The details of the drive arrangement for driving the rear wheel 17 will now be described by particular reference to FIGS. 3 through 6, with FIG. 3 showing the relationship of the components in schematic form, while FIGS. 4 through 6 show the actual physical construction.

It may be seen in FIG. 4, one of the back stays 18 is tubular in configuration and passes a drive shaft 30 which carries a bevel gear 34 at its rear end. This bevel gear 34 is contained within a housing 35 formed at the end of this side of the back stay 18 and which housing also supports an axle 36 of the rear wheel 17 in a fixed manner. The axle 36 journals a hub 37 which carries a driven bevel gear 38 which is enmeshed with the driving bevel gear 34 of the drive shaft 30. The driven bevel gear 38 is coupled by means of a one-way clutch 39 to the rear wheel hub 37 so as to drive the hub 37 and rear wheel 17. However, the one-way clutch 39 will permit overrunning during coasting so that the rear wheel 17 may coast freely relative to the drive shaft 30.

The back stay 18, at the opposite side from the drive shaft 33 is formed with a flattened portion 41 to which the other side of the axle 36 is affixed in any known manner.

The drive shaft 30 may be driven by the crankshaft 28 under manual power and by the electric motor 29 for power assist in the manner which will now be described. This construction still is described by reference to FIGS. 3 through 6.

For mechanical operation by the pedals 27, the crankshaft 28 is coupled by means of a one-way clutch 42 to a speed increasing planetary gear set, indicated generally by the reference numeral 43. Specifically, the way-one clutch 42 interconnects the crank 28 to a planet carrier on which planet gears 44 are rotatably journalled. The planet gears 44 are enmeshed with a sun gear 45 that is affixed to the torque detecting mechanism 33 in a manner which will be described. The planet gears 44 further are engaged with a ring gear 46 which, in turn, is affixed to a bevel gear 47.

The bevel gear 47 is, in turn, affixed to a resulting force shaft 48 which is journalled around the crankshaft 28 and which has a bevel gear connection 49 for driving the drive shaft 30. Hence, rotation of the crankshaft 28 by operating the pedals 27 will effect driving of the drive shaft 30 through the one-way clutch 42 and planetary transmission 43 which, in turn, drives the resulting force shaft 48 and bevel gear transmission 49. The one-way clutch 42 will prevent driving of the crank assembly 28 by the motor 29.

Referring now to the electric motor drive 29 and the way in which the electric motor is coupled to the drive shaft 30, this construction also appears in FIGS. 3 through 6. The electric motor 29 is mounted within the frame 12 so that its output shaft 51 rotates about an axis "A" which is disposed substantially midway of the transverse side of the frame assembly 12 and which extended perpendicularly to the axis of rotation of the crankshaft 28. The motor output shaft 51 drives a further planetary gear reduction set, indicated generally by the reference numeral 52 through a one-way clutch 53 which permits the drive to be transmitted, but which prevent driving of the motor shaft 51 when the motor 29 is not energized. The planetary transmission 52 includes a sun gear 54 which is driven by the one-way clutch 53 and which is enmeshed with a plurality of planet gears carried on a planetary carrier 55. The planetary carrier 55 is, in turn, affixed to a bevel gear 56 which is enmeshed with the bevel gear 47 so as to also drive this bevel gear 47. The planet gears on the carrier 55 are also engaged with a fixed ring gear which is held to the case 25 in a suitable manner. The planetary transmission 52 is of the speed reducing type so that the bevel gear 56 will be driven at a lower speed than the electric motor drive shaft 51.

The pedal force detecting mechanism 33 will now also be described by reference to the same figures. This mechanism includes a lever 58 which is affixed to the sun gear 45 at one side of the assembly and which carries a pair of lugs 59 and 61. The lug 59 is adapted to engage, in one extreme position, a fixed stop 62 carried by the frame portion 23. The lug 61, on the other hand, is adapted to engage a second lever 63 which is affixed to the shaft of a potentiometer 64 and which, in turn, is engaged by a resilient damper 65, so that the rotation of the ever 63 and potentiometer 64 will indicate the amount of pedal force exerted by the operator on the crankshaft 28. This pedal force is then used, in the manner now to be described, so as to control the operation of the electric motor 29.

Figure 2:
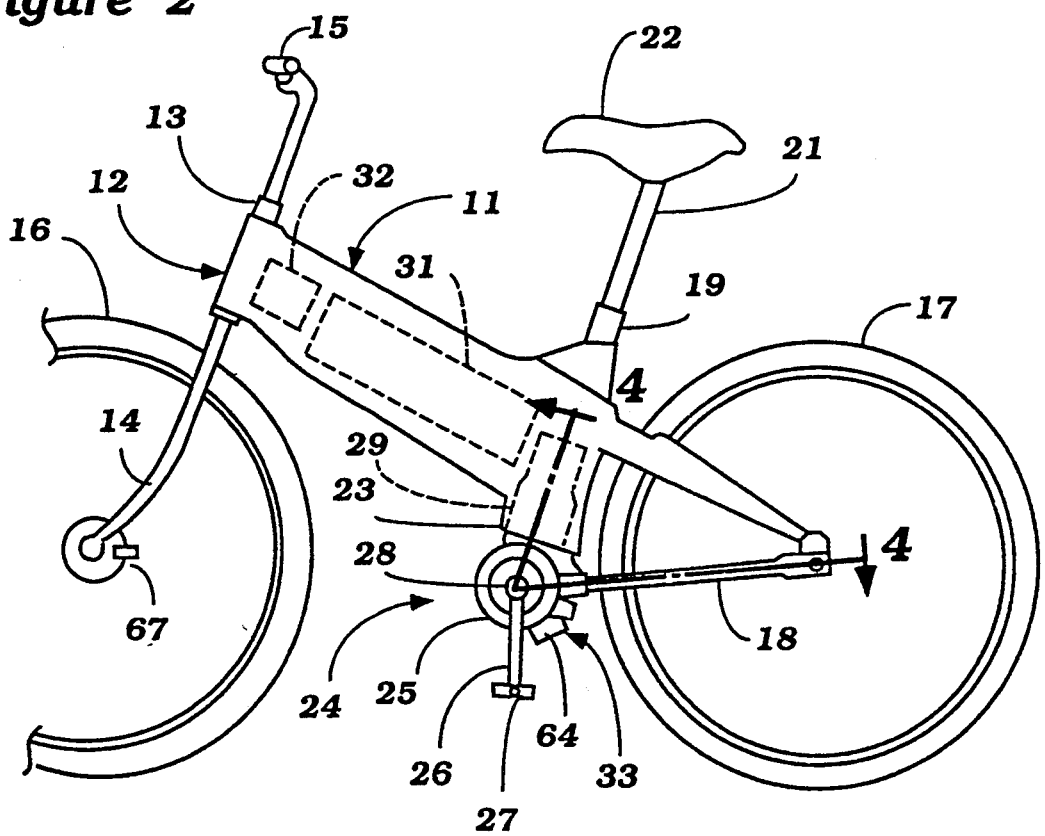
FIG. 2 is a side elevational view of a bicycle with an electric motor assist constructed in accordance with an embodiment of the invention.

There are two additional components of the system which will be described and these components include a vehicle speed detector 66 which, in FIG. 4 is illustrated as being an inductive device that cooperates with the ring gear 48 so as to provide a speed signal indicative of speed of the bicycle 11. Alternatively, a front wheel mounted speedometer 67 (FIG. 2) can be employed. As a further alternative location, the speed detector 66 may be positioned between the crankshaft 28 and the one-way clutch 43. If this is done, the revolution speed $N_O$ gradually becomes 0 if the crankshaft is stopped and at this time the no-load motor voltage is also reduced to 0 so as to further reduce the energy consumption. The system further includes a memory 68 (FIG. 3) which memorizes certain data such as the speed of the electric motor $N_O$ for a given vehicle speed S and the motor torque $T_M$ which corresponds to the pedal force $F_L$.

As has been previously noted, with the prior art type of systems, the motor 29 is not operated until there is exerted an actual pedal force and thus upon the initiation of motor operation, the motor must be accelerated up to a speed corresponding to the speed at which the bicycle 11 is traveling before any power assist can be accomplished. This provides a delay in the application of power and the use of excess electrical energy. In accordance with the invention, the device operates so as to provide the necessary electrical current to the electric motor 29 so that the electric motor 29 will be driven at a speed corresponding to the bicycle speed S (motor speed $N_O$) under all conditions even when no pedal force is exerted as crank top and bottom dead center conditions.

Basically, the controller 32 operates to provide a no-load motor voltage ($V_{MO}$) at which the revolution $N_O$ speed of the electric motor 29 corresponds to the bicycle speed S even when the pedal depressing force instantaneously indicates no requirement for motor assist. Thus the controller 32 will provide a motor voltage ($V_M$) above the no-load voltage ($V_{MO}$).

In a DC motor, the following equation expresses the relationship between the voltage ($V_M$) applied to the motor, the current (I) through the motor and the speed (N) of the motor:

$$V_M = I \cdot R + k \cdot N$$

where R is the equivalent resistance of the armature, k is a proportional coefficient and k·N represents the counter-electromotive force of the armature.

While the motor torque ($T_m$) depends upon whether the motor is of the series or shunt type, torque is generally proportional to motor current (I) and therefore the following equation is true where C equals a constant:

$$T_M = C \cdot I$$

Therefore, assuming (R/C)=j, the following equation may be derived:

$$V_M = j \cdot T_M + k \cdot N \qquad (1)$$

In this equation, the first term is related to torque (j·$T_M$) and the second term is related to speed (k·N).

As has been noted, in conventional systems when there is no pedal force even if the bicycle is in motion, the motor revolutions is made equal to zero and the motor drive force is also zero. Thus, in equation (1) $T_M=0$ and N=0 and therefore the voltage $V_M$ applied to the motor is also zero.

In this invention, on the other hand, the electric motor 29 is maintained at a revolution $N_O$ even when the pedal force $F_L$ becomes zero. That is, the engine revolution N=$N_O$ as motor torque $T_M=0$ at the time of no-load is applied and therefore the following equation results:

$$V_M = j \tau_M 0 \cdot k \cdot N_O = k \cdot N_O$$

Thus, assuming the voltage $V_M$ as the no-loaded voltage $V_{MO}$ and maintaining the motor voltage at this voltage $V_{MO}$ when the motor voltage $V_M$ decreases below $V_{MO}$, the electric motor speed N is maintained at $N_O$ even when the pedal force $F_L$ stops. As a result, when the pedal force $F_L$ increases such that $V_M$ is $\geq V_{MO}$ the motor only has to produce the drive force $F_M$ from the revolution $N_O$ and thus the time delay for acceleration of the motor is eliminated and the energy for acceleration is reduced. Also, since the current is extremely small for periods of no-load motor voltage $V_{MO}$ for maintaining the motor speed at $N_O$, the consumption of electrical energy is extremely small and much smaller than that required for acceleration conditions.

Figure 7:
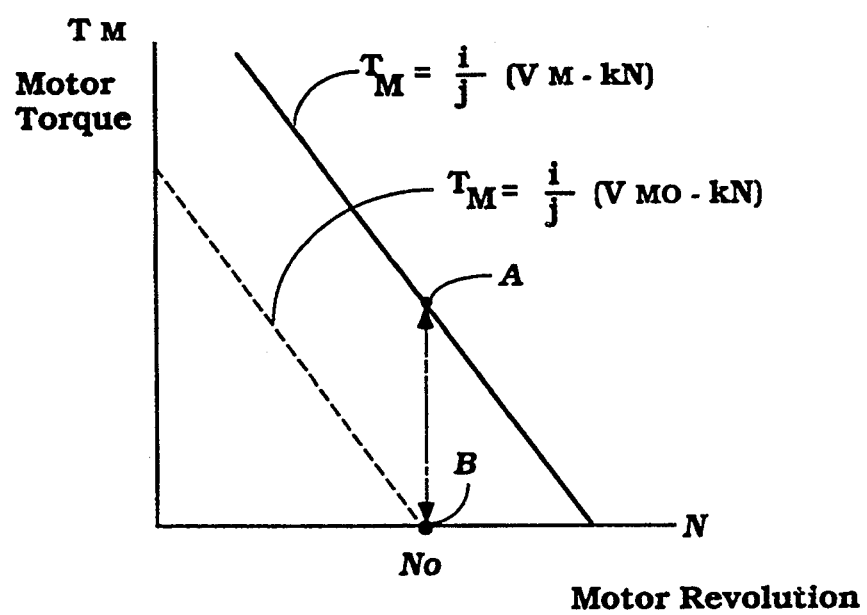
FIG. 7 is a graphical view showing the mode of operation so that the servo motor will be driven at the speed the bicycle is driven regardless of whether power assist is required or not so as to eliminate the time delay problems with the prior art types of construction.

The way the device operates may be understood by reference to FIG. 7 in which the solid line curve shows motor torque $T_M$ versus motor speed $N_M$ at motor voltage $V_M$ and motor speed decreases as the load increases. As the motor is engaged to the rear wheel, motor speed is held at $N_O$. The operation point is indicated as "A". The dotted line curve shows the motor torque versus motor speed at motor voltage $V_{MO}$. When the pedal force is instantaneously 0, the required motor torque is also 0. Therefore, the operation point is indicated as "B" Hence, it may be seen that power assist is accomplished merely by moving vertically between the points "B" and "A" and the described results will be achieved with the advantages noted.

Of course, the calculations described are merely typical and the specific application can depend upon the actual components employed. It is believed that those skilled in the art can readily practice the invention from the foregoing description, which is only that of a preferred embodiment of the invention, and that various changes and modifications may be made without departing from the spirit and scope of the invention, as defined by the appended claims.

We claim:

1. A power assist mechanism for a manually operated device comprising manual driving means for operation to manually drive said manually operated device, a servo motor for driving said manually operated device to provide a power assist therefore, a force sensor for sensing the manual force supplied to said manual driving means, a first control for applying power to said servo motor for providing a driving power to said servo motor only in proportion to the manual force sensed by said force sensor, a speed sensor which senses speed of movement of the manually operated device, and a second control for applying sufficient power to said servo motor for driving said servo motor only at a speed sensed by said speed sensor and regardless of the force sensed by said force sensor so that said servo motor will be continuously driven at least at the speed sensed by said speed sensor for reducing delays in power assist when a force is sensed by said force sensor.

2. A power assist mechanism for a manually operated device as set forth in claim 1 wherein the servo motor comprises an electric motor.

3. A power assist mechanism for a manually operated device as set forth in claim 2 wherein the electric motor drives the manually operated device through a one-way clutch.

4. A power assist mechanism for a manually operated device as set forth in claim 1 wherein the manual driving means comprises a crank.

5. A power assist mechanism for a manually operated device as set forth in claim 4 wherein the crank drives the manually operated device through a one-way clutch.

6. A power assist mechanism for a manually operated device as set forth in claim 5 wherein the servo motor comprises an electric motor.

7. A power assist mechanism for a manually operated device as set forth in claim 6 wherein the electric motor drives the manually operated device through a one-way clutch.

8. A power assist mechanism for a manually operated device as set forth in claim 1 wherein the manually operated device comprises a bicycle.

9. A power assist mechanism for a bicycle as set forth in claim 8 wherein the servo motor comprises an electric motor.

10. A power assist mechanism for a bicycle as set forth in claim 9 wherein the electric motor drives the bicycle through a one-way clutch.

11. A power assist mechanism for a bicycle as set forth in claim 8 wherein the manual driving means comprises a crank.

12. A power assist mechanism for a bicycle as set forth in claim 11 wherein the crank drives the bicycle through a one-way clutch.

13. A power assist mechanism for a bicycle as set forth in claim 12 wherein the servo motor comprises an electric motor.

14. A power assist mechanism for a bicycle as set forth in claim 13 wherein the electric motor drives the bicycle through a one-way clutch.

15. A power assist mechanism as set forth in claim 1, wherein the manual driving means comprises a crank.

16. A power assist mechanism as set forth in claim 15, wherein the force sensor senses the torque exerted by the crank.

17. A power assist mechanism as set forth in claim 8, wherein the speed sensor senses the speed of the bicycle.

18. A power assist mechanism as set forth in claim 17, wherein the manual driving means comprises a crank.

19. A power assist mechanism as set forth in claim 18, wherein the force sensor senses the torque exerted by the crank.

* * * * *